(12) United States Patent
Bhasin

(10) Patent No.: US 12,051,068 B2
(45) Date of Patent: Jul. 30, 2024

(54) SYSTEM, METHOD, AND COMPUTER PROGRAM PRODUCT FOR REMOTE AUTHORIZATION OF PAYMENT TRANSACTIONS

(71) Applicant: Visa International Service Association, San Francisco, CA (US)

(72) Inventor: Gurpreet Singh Bhasin, Fremont, CA (US)

(73) Assignee: Visa International Service Association, San Francisco, CA (US)

( * ) Notice: Subject to any disclaimer, the term of this patent is extended or adjusted under 35 U.S.C. 154(b) by 1 day.

(21) Appl. No.: 17/763,608

(22) PCT Filed: Oct. 1, 2019

(86) PCT No.: PCT/US2019/054004
§ 371 (c)(1),
(2) Date: Mar. 24, 2022

(87) PCT Pub. No.: WO2021/066809
PCT Pub. Date: Apr. 8, 2021

(65) Prior Publication Data
US 2022/0335424 A1    Oct. 20, 2022

(51) Int. Cl.
*G06Q 20/40*      (2012.01)
*G06Q 20/20*      (2012.01)
*G06Q 20/32*      (2012.01)

(52) U.S. Cl.
CPC ............ *G06Q 20/40* (2013.01); *G06Q 20/20* (2013.01); *G06Q 20/3223* (2013.01); *G06Q 20/327* (2013.01)

(58) Field of Classification Search
CPC .... G06Q 20/40; G06Q 20/20; G06Q 20/3223; G06Q 20/327
See application file for complete search history.

(56) References Cited

U.S. PATENT DOCUMENTS 4,594,663 A    6/1986   Nagata et al.
7,434,723 B1   10/2008   White et al.
(Continued)

FOREIGN PATENT DOCUMENTS

WO     2018169686 A1    9/2018

OTHER PUBLICATIONS

Park, Frank S., Chinmay Gangakhedkar, and Patrick Traynor. "Leveraging cellular infrastructure to improve fraud prevention." 2009 Annual Computer Security Applications Conference. IEEE, 2009. (Year: 2009).*

*Primary Examiner* — Asfand M Sheikh
(74) *Attorney, Agent, or Firm* — The Webb Law Firm

(57) ABSTRACT

Provided are computer-implemented methods for event-based communication and messaging that may include receiving transaction data for a transaction from a mobile device controlled by a requesting user, generating a payment request message based on the transaction data, transmitting the payment request message to a first plurality of mobile devices, and determining if at least one payment response message is received from at least one mobile device of the first plurality of mobile devices within a first time period. In some non-limiting embodiments or aspects, the methods may further include transmitting the payment request message to a second plurality of mobile devices, receiving a payment response message including an indication that the transaction is authorized, and processing the transaction using a payment account associated with the mobile device that transmitted the payment response message. Systems and computer program products are also provided.

20 Claims, 4 Drawing Sheets

(56) References Cited

U.S. PATENT DOCUMENTS

| | | | |
|---|---|---|---|
| 8,459,544 B2* | 6/2013 | Casey | G06Q 20/2295 |
| | | | 235/382.5 |
| 9,665,864 B2 | 5/2017 | Prakash et al. | |
| 11,341,504 B1* | 5/2022 | Stanev | G06Q 20/405 |
| 11,443,260 B1* | 9/2022 | van Breen | G08G 1/095 |
| 11,610,191 B1* | 3/2023 | Janiga | G06Q 20/1085 |
| 2007/0078760 A1 | 4/2007 | Conaty et al. | |
| 2010/0121767 A1* | 5/2010 | Coulter | G06Q 20/02 |
| | | | 705/17 |
| 2010/0161422 A1* | 6/2010 | Zeevi | G06Q 30/0244 |
| | | | 705/16 |
| 2011/0219230 A1* | 9/2011 | Oberheide | H04W 12/06 |
| | | | 713/168 |
| 2012/0182966 A1* | 7/2012 | Das | H04W 8/005 |
| | | | 370/328 |
| 2012/0290449 A1* | 11/2012 | Mullen | G06Q 20/352 |
| | | | 705/26.1 |
| 2012/0330784 A1* | 12/2012 | Nahidipour | G06Q 20/20 |
| | | | 705/26.1 |
| 2013/0005331 A1* | 1/2013 | Turgeman | H04W 4/029 |
| | | | 455/426.1 |
| 2013/0030875 A1* | 1/2013 | Lee | G06Q 30/0601 |
| | | | 705/14.58 |
| 2013/0124422 A1* | 5/2013 | Hubert | H04L 9/32 |
| | | | 705/71 |
| 2013/0238455 A1 | 9/2013 | Laracey | |
| 2014/0006280 A1 | 1/2014 | Scipioni et al. | |
| 2014/0081854 A1 | 3/2014 | Sanchez et al. | |
| 2015/0012385 A1* | 1/2015 | Bahnsen | G06Q 30/06 |
| | | | 705/26.61 |
| 2015/0127401 A1* | 5/2015 | Hogg | G06Q 30/0281 |
| | | | 705/7.15 |
| 2016/0239842 A1 | 8/2016 | Cash et al. | |
| 2017/0083850 A1* | 3/2017 | Crow | G06F 16/2477 |
| 2017/0103374 A1 | 4/2017 | Bhattacharjee et al. | |
| 2017/0186003 A1* | 6/2017 | Monaghan | G06Q 20/405 |
| 2017/0351982 A1* | 12/2017 | Tineo | G06Q 10/0631 |
| 2019/0057385 A1 | 2/2019 | Nair et al. | |
| 2020/0090266 A1* | 3/2020 | Stern | G06Q 40/03 |
| 2020/0351818 A1* | 11/2020 | Park | H04W 4/90 |
| 2022/0051252 A1* | 2/2022 | Segal | G06Q 20/4016 |

* cited by examiner

SYSTEM, METHOD, AND COMPUTER PROGRAM PRODUCT FOR REMOTE AUTHORIZATION OF PAYMENT TRANSACTIONS

CROSS-REFERENCE TO RELATED APPLICATION

This application is the United States national phase of International Application No. PCT/US2019/054004 filed Oct. 1, 2019, the entire disclosure of which is hereby incorporated by reference in its entirety.

BACKGROUND

1. Technical Field

This disclosure relates generally to remote authorization and, in one particular non-limiting embodiment, to a system, method, and computer program product for remote authorization of payment transactions.

2. Technical Considerations

When initiating a payment transaction, individuals initiating the payment transactions may do so using accounts issued to such individuals. For example, an individual may present a payment card (e.g., a credit card, a debit card, and/or the like) that a merchant may scan to communicate account information to the merchant system processing the payment transaction. However, where the individual is using an account belonging to a different individual (e.g., an account holder different from the individual), the account holder may have to communicate information to the individual using the account to verify that the payment card may be used. For example, when a debit card is given from one an account holder to an individual, a personal identification number (PIN) may also be communicated to enable the individual to use the debit card in a payment transaction.

By virtue of communication of such information (e.g., the PIN) by the account holder to the individual, account security may be reduced. This communication, in turn, may lead to the account being involved in payment transactions that are not commiserate with the scope of which the account holder authorized. As a result, to deter such unanticipated use, additional communication may be involved (e.g., a phone call may be made to the account holder where suspicious activity is detected but not automatically declined). Additionally, systems processing the payment transaction may expend additional resources determining whether the payment transaction is fraudulent. In both cases, the time needed to perform a payment transaction may be increased and/or the payment transaction may be declined in error.

SUMMARY

Accordingly, and generally, provided are improved computer-implemented systems, methods, and computer program products for remote authorization of payment transactions that overcome some or all of the deficiencies.

According to some non-limiting embodiments or aspects, provided is a computer-implemented method for remote authorization, the computer-implemented method including: receiving, with at least one processor, transaction data for a transaction from a mobile device controlled by a requesting user, the transaction data comprising a transaction value and a user identifier; generating, with at least one processor, a payment request message based on the transaction data; transmitting, with at least one processor, the payment request message to a first plurality of mobile devices; determining, with at least one processor, if at least one payment response message is received from at least one mobile device of the first plurality of mobile devices within a first time period; in response to determining that the at least one payment response message is not received within the first time period, transmitting, with at least one processor, the payment request message to a second plurality of mobile devices different from the first plurality of mobile devices; receiving, with at least one processor, a payment response message from a mobile device of the second plurality of mobile devices, the payment response message including an indication that the transaction is authorized; and in response to receiving the payment response message including the indication that the transaction is authorized, processing the transaction using a payment account associated with the mobile device that transmitted the payment response message.

In some non-limiting embodiments or aspects, the transaction data may further include an indication to process the transaction using the payment account, wherein the payment account is selected from a plurality of payment accounts, and wherein the payment request message is transmitted to the first plurality of mobile devices based on the payment account.

According to some non-limiting embodiments or aspects, each mobile device of the first plurality of mobile devices may be associated with a first authorizing user or a secondary authorizing user, and wherein each mobile device of the second plurality of mobile devices is associated with a back-up authorizing user.

In some non-limiting embodiments or aspects, transmitting the payment request message to the first plurality of mobile devices may include transmitting, with at least one processor, the payment request message to the mobile device associated with the requesting user via a short-range wireless communication connection, wherein the mobile device associated with the requesting user transmits the payment request message to the first plurality of mobile devices based on receiving the payment request message from a merchant system associated with a merchant involved in the transaction.

In some non-limiting embodiments or aspects, the computer-implemented method may further include registering, with at least one processor, each mobile device of the second plurality of mobile devices with at least one mobile device of the first plurality of mobile devices; and determining, with at least one processor, the payment account based on receiving the payment response message from the mobile device of the second plurality of mobile devices, wherein the payment account is controlled by a first authorizing user of a mobile device of the first plurality of mobile devices.

According to some non-limiting embodiments or aspects, the computer-implemented method may include determining, with at least one processor, the first time period based on merchant data associated with a merchant involved in the transaction.

In some non-limiting embodiments or aspects, the first time period may be determined based on an average amount of transactions initiated within a time period at a point-of-sale (POS) device.

According to some non-limiting embodiments or aspects, generating the payment request message based on the transaction data may include determining, with at least one processor, that the transaction does not satisfy one or more rules, wherein the at least one processor transmits the payment request message to the first plurality of mobile devices based on determining that the transaction does not satisfy the one or more rules.

In some non-limiting embodiments or aspects, determining that the transaction does not satisfy the one or more rules may include determining, with at least one processor, at least one of the following: that an upper limit for transactions involving the requesting user will be exceeded if the transaction is authorized; that an upper limit of a plurality of transactions involving the requesting user will be exceeded if the transaction is authorized; that an amount of transactions authorized within a predetermined time period involving the requesting user will be exceeded if the transaction is authorized; that a location associated with the transaction is not associated with a defined area; or any combination thereof.

According to some non-limiting embodiments or aspects, a computer-implemented method may include generating, with at least one processor, a payment request message based on transaction data for a transaction involving a requesting user; transmitting, with at least one processor, the payment request message to a mobile device associated with a first authorizing user, the first authorizing user associated with a first account identifier; determining, with at least one processor, that a payment response message is not received within a first time period after transmitting the payment request message to the mobile device associated with the first authorizing user; in response to determining that the payment response message is not received within the first time period, transmitting, with at least one processor, the payment request message to at least one mobile device associated with at least one secondary authorizing user, the at least one secondary authorizing user associated with a second account identifier; determining, with at least one processor, that the payment response message is not received within a second time period after transmitting the payment request message to the at least one mobile device associated with the at least one secondary authorizing user; in response to determining that the payment response message is not received within the second time period, transmitting, with at least one processor, the payment request message to a mobile device associated with a back-up authorizing user; receiving, with at least one processor, a payment response message including an indication that the transaction is authorized from the mobile device associated with the back-up authorizing user; and processing, with at least one processor, the transaction using the payment account associated with the first account identifier based on the payment response message.

In some non-limiting embodiments or aspects, the computer-implemented method may include determining, with at least one processor, at least one of the first time period and the second time period based on merchant data associated with a merchant involved in the transaction.

According to some non-limiting embodiments or aspects, the computer-implemented method may include determining, with at least one processor, the first time period based on merchant data associated with a point-of-sale (POS) device of a merchant involved in the transaction.

In some non-limiting embodiments or aspects, transmitting the payment request message to the mobile device associated with the first authorizing user may be based on determining that the transaction does not satisfy one or more rules for transactions involving the requesting user.

According to some non-limiting embodiments or aspects, the computer-implemented method may include receiving, with at least one processer, the transaction data for the transaction associated with the requesting user from a mobile device associated with the requesting user, the transaction data comprising a transaction value, a user identifier, and the first account identifier; generating, with at least one processor, a payment request message based on the transaction data for the transaction; and determining, with at least one processor, to transmit the payment request message to the mobile device associated with the first authorizing user based on the transaction data for the transaction.

In some non-limiting embodiments or aspects, the computer-implemented method may include registering, with at least one processor, the mobile device associated with the back-up authorizing user with the mobile device of the first authorizing user; and determining, with at least one processor, a payment account based on receiving the payment response message from the mobile device associated with the back-up authorizing user, wherein the payment account is controlled by the first authorizing user.

According to some non-limiting embodiments or aspects, a system may include at least one processor programmed or configured to: generate a payment request message based on receiving transaction data for a transaction from a mobile device associated with a requesting user; transmit the payment request message to a first plurality of mobile devices; determine if at least one payment response message is received from at least one mobile device of the first plurality of mobile devices within a first time period; transmit the payment request message to a second plurality of mobile devices different from the first plurality of mobile devices based on determining that the at least one payment response message was not received within the first time period; receive a payment response message from a mobile device of the second plurality of mobile devices, the payment response message comprising an indication that the transaction is authorized and an account identifier; and process the transaction based on the payment response message.

In some non-limiting embodiments or aspects, the at least one processor may be further programmed or configured to: register each mobile device of the second plurality of mobile devices with at least one mobile device of the first plurality of mobile devices, wherein each mobile device of the first plurality of mobile devices is associated with an account identifier for a payment account controlled by a first authorizing user or a secondary authorizing user; and wherein each mobile device of the second plurality of mobile devices is configured to transmit the payment response message to cause the at least one processor to process the transaction based on the account identifier associated with the at least one mobile device of the first plurality of mobile devices that is registered with the mobile device that transmitted the payment response message.

According to some non-limiting embodiments or aspects, when processing the transaction based on the payment response message, the at least one processor is programmed or configured to: determine the payment account based on the account identifier; generate an authorization request message based on the transaction data for the transaction and the payment account; and transmit the authorization request message to at least one issuer system.

In some non-limiting embodiments or aspects, wherein the at least one processor may be further programmed or configured to: determine the first time period based on merchant data associated with a point-of-sale (POS) device of a merchant.

According to some non-limiting embodiments or aspects, transmitting the payment request message to the first plurality of mobile devices may be based on determining that the transaction does not satisfy one or more rules.

Further embodiments or aspects are set forth in the following numbered clauses:

Clause 1: A computer-implemented method for remote authorization, comprising: receiving, with at least one processor, transaction data for a transaction from a mobile device controlled by a requesting user, the transaction data comprising a transaction value and a user identifier; generating, with at least one processor, a payment request message based on the transaction data; transmitting, with at least one processor, the payment request message to a first plurality of mobile devices; determining, with at least one processor, if at least one payment response message is received from at least one mobile device of the first plurality of mobile devices within a first time period; in response to determining that the at least one payment response message is not received within the first time period, transmitting, with at least one processor, the payment request message to a second plurality of mobile devices different from the first plurality of mobile devices; receiving, with at least one processor, a payment response message from a mobile device of the second plurality of mobile devices, the payment response message including an indication that the transaction is authorized; and in response to receiving the payment response message including the indication that the transaction is authorized, processing the transaction using a payment account associated with the mobile device that transmitted the payment response message.

Clause 2. The computer-implemented method of clause 1, wherein the transaction data further comprises an indication to process the transaction using the payment account, wherein the payment account is selected from a plurality of payment accounts, and wherein the payment request message is transmitted to the first plurality of mobile devices based on the payment account.

Clause 3: The computer-implemented method of clauses 1 or 2, wherein each mobile device of the first plurality of mobile devices is associated with a first authorizing user or a secondary authorizing user, and wherein each mobile device of the second plurality of mobile devices is associated with a back-up authorizing user.

Clause 4: The computer-implemented method of any of clauses 1-3, wherein transmitting the payment request message to the first plurality of mobile devices comprises: transmitting, with at least one processor, the payment request message to the mobile device associated with the requesting user via a short-range wireless communication connection, wherein the mobile device associated with the requesting user transmits the payment request message to the first plurality of mobile devices based on receiving the payment request message from a merchant system associated with a merchant involved in the transaction.

Clause 5: The computer-implemented method of any of clauses 1-4, further comprising: registering, with at least one processor, each mobile device of the second plurality of mobile devices with at least one mobile device of the first plurality of mobile devices; and determining, with at least one processor, the payment account based on receiving the payment response message from the mobile device of the second plurality of mobile devices, wherein the payment account is controlled by a first authorizing user of a mobile device of the first plurality of mobile devices.

Clause 6: The computer-implemented method of any of clauses 1-5, further comprising: determining, with at least one processor, the first time period based on merchant data associated with a merchant involved in the transaction.

Clause 7: The computer-implemented method of any of clauses 1-6, wherein the first time period is determined based on an average amount of transactions initiated within a time period at a point-of-sale (POS) device.

Clause 8: The computer-implemented method of any of clauses 1-7, wherein generating the payment request message based on the transaction data comprises: determining, with at least one processor, that the transaction does not satisfy one or more rules, wherein the at least one processor transmits the payment request message to the first plurality of mobile devices based on determining that the transaction does not satisfy the one or more rules.

Clause 9: The computer-implemented method of any of clauses 1-8, wherein determining that the transaction does not satisfy the one or more rules comprises determining, with at least one processor, at least one of the following: that an upper limit for transactions involving the requesting user will be exceeded if the transaction is authorized; that an upper limit of a plurality of transactions involving the requesting user will be exceeded if the transaction is authorized; that an amount of transactions authorized within a predetermined time period involving the requesting user will be exceeded if the transaction is authorized; that a location associated with the transaction is not associated with a defined area; or any combination thereof.

Clause 10: A computer-implemented method, comprising: generating, with at least one processor, a payment request message based on transaction data for a transaction involving a requesting user; transmitting, with at least one processor, the payment request message to a mobile device associated with a first authorizing user, the first authorizing user associated with a first account identifier; determining, with at least one processor, that a payment response message is not received within a first time period after transmitting the payment request message to the mobile device associated with the first authorizing user; in response to determining that the payment response message is not received within the first time period, transmitting, with at least one processor, the payment request message to at least one mobile device associated with at least one secondary authorizing user, the at least one secondary authorizing user associated with a second account identifier; determining, with at least one processor, that the payment response message is not received within a second time period after transmitting the payment request message to the at least one mobile device associated with the at least one secondary authorizing user; in response to determining that the payment response message is not received within the second time period, transmitting, with at least one processor, the payment request message to a mobile device associated with a back-up authorizing user; receiving, with at least one processor, a payment response message including an indication that the transaction is authorized from the mobile device associated with the back-up authorizing user; and processing, with at least one processor, the transaction using the payment account associated with the first account identifier based on the payment response message.

Clause 11: The computer-implemented method of clause 10, further comprising: determining, with at least one processor, at least one of the first time period and the second time period based on merchant data associated with a merchant involved in the transaction.

Clause 12: The computer-implemented method of clauses 10 or 11, further comprising: determining, with at least one processor, the first time period based on merchant data associated with a point-of-sale (POS) device of a merchant involved in the transaction.

Clause 13: The computer-implemented method of any of clauses 10-12, wherein transmitting the payment request message to the mobile device associated with the first authorizing user is based on determining that the transaction does not satisfy one or more rules for transactions involving the requesting user.

Clause 14: The computer-implemented method of any of clauses 10-13, further comprising: receiving, with at least one processer, the transaction data for the transaction associated with the requesting user from a mobile device associated with the requesting user, the transaction data comprising a transaction value, a user identifier, and the first account identifier; generating, with at least one processor, a payment request message based on the transaction data for the transaction; and determining, with at least one processor, to transmit the payment request message to the mobile device associated with the first authorizing user based on the transaction data for the transaction.

Clause 15: The computer-implemented method of any of clauses 10-14, further comprising: registering, with at least one processor, the mobile device associated with the back-up authorizing user with the mobile device of the first authorizing user; and determining, with at least one processor, a payment account based on receiving the payment response message from the mobile device associated with the back-up authorizing user, wherein the payment account is controlled by the first authorizing user.

Clause 16: A system, comprising: at least one processor programmed or configured to: generate a payment request message based on receiving transaction data for a transaction from a mobile device associated with a requesting user; transmit the payment request message to a first plurality of mobile devices; determine if at least one payment response message is received from at least one mobile device of the first plurality of mobile devices within a first time period; transmit the payment request message to a second plurality of mobile devices different from the first plurality of mobile devices based on determining that the at least one payment response message was not received within the first time period; receive a payment response message from a mobile device of the second plurality of mobile devices, the payment response message comprising an indication that the transaction is authorized and an account identifier; and process the transaction based on the payment response message.

Clause 17: The system of clause 16, wherein the at least one processor is further programmed or configured to: register each mobile device of the second plurality of mobile devices with at least one mobile device of the first plurality of mobile devices, wherein each mobile device of the first plurality of mobile devices is associated with an account identifier for a payment account controlled by a first authorizing user or a secondary authorizing user; and wherein each mobile device of the second plurality of mobile devices is configured to transmit the payment response message to cause the at least one processor to process the transaction based on the account identifier associated with the at least one mobile device of the first plurality of mobile devices that is registered with the mobile device that transmitted the payment response message.

Clause 18: The system of clauses 16 or 17, wherein, when processing the transaction based on the payment response message, the at least one processor is programmed or configured to: determine the payment account based on the account identifier; generate an authorization request message based on the transaction data for the transaction and the payment account; and transmit the authorization request message to at least one issuer system.

Clause 19: The system of any of clauses 16-18, wherein the at least one processor is further programmed or configured to: determine the first time period based on merchant data associated with a point-of-sale (POS) device of a merchant.

Clause 20: The system of any of clauses 16-19, wherein, when transmitting the payment request message to the first plurality of mobile devices is based on determining that the transaction does not satisfy one or more rules.

The features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the present disclosure. As used in the specification and the claims, the singular form of "a," "an," and "the" include plural referents unless the context clearly dictates otherwise.

BRIEF DESCRIPTION OF THE DRAWINGS

Additional advantages and details of the present disclosure are explained in greater detail below with reference to the exemplary embodiments that are illustrated in the accompanying schematic figures, in which.

DETAILED DESCRIPTION

Figure 1:
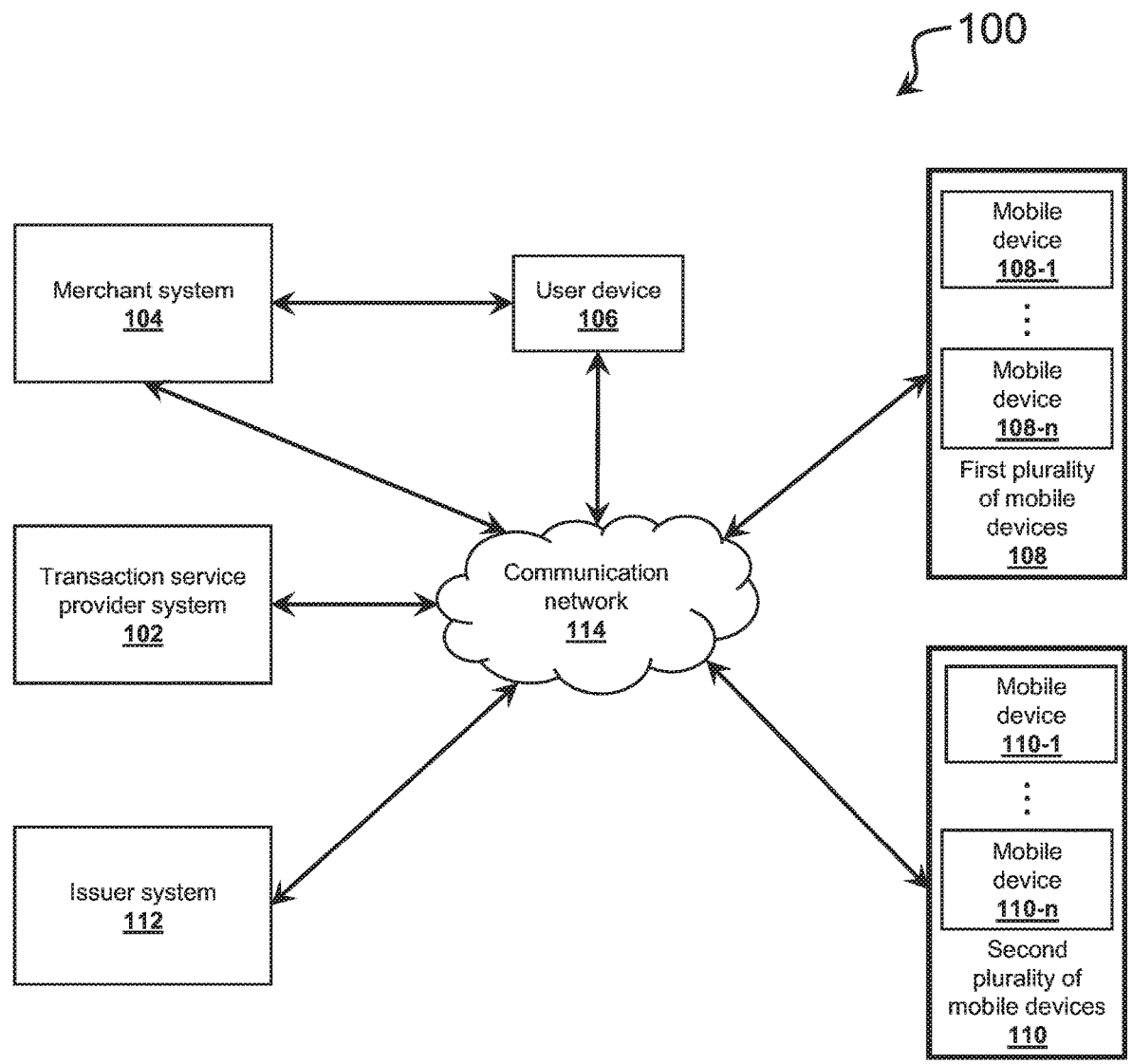
FIG. 1 is a diagram of a non-limiting embodiment of an environment in which systems, apparatuses, and/or methods, as described herein, may be implemented.

For purposes of the description hereinafter, the terms "end," "upper," "lower," "right," "left," "vertical," "horizontal," "top," "bottom," "lateral," "longitudinal," and derivatives thereof shall relate to the disclosure as it is oriented in the drawing figures. However, it is to be understood that the disclosure may assume various alternative variations and step sequences, except where expressly specified to the contrary. It is also to be understood that the specific devices and processes illustrated in the attached drawings, and described in the following specification, are simply exemplary embodiments or aspects of the disclosure. Hence, specific dimensions and other physical characteristics related to the embodiments or aspects of the embodiments disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to include one or more items, and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively send information to the second unit. As another example, a first unit may be in communication with a second unit if at least one intermediary unit (e.g., a third unit located between the first unit and the second unit) processes information received from the first unit and sends the processed information to the second unit. In some non-limiting embodiments or aspects, a message may refer to a network packet (e.g., a data packet and/or the like) that includes data.

As used herein, the terms "issuer," "issuer institution," "issuer bank," or "payment device issuer," may refer to one or more entities that provide accounts to individuals (e.g., users, customers, and/or the like) for conducting payment transactions such as such as credit payment transactions and/or debit payment transactions. For example, an issuer institution may provide an account identifier, such as a primary account number (PAN), to a customer that uniquely identifies one or more accounts associated with that customer. In some non-limiting embodiments or aspects, an issuer may be associated with a bank identification number (BIN) that uniquely identifies the issuer institution. As used herein, the term "issuer system" may refer to one or more computer systems operated by or on behalf of an issuer, such as a server executing one or more software applications. For example, an issuer system may include one or more authorization servers for authorizing a transaction.

As used herein, the term "account identifier" may include one or more types of identifiers associated with an account (e.g., a PAN associated with an account, a card number associated with an account, a payment card number associated with an account, a token associated with an account, and/or the like). In some non-limiting embodiments or aspects, an issuer may provide an account identifier (e.g., a PAN, a token, and/or the like) to a user (e.g., an account holder) that uniquely identifies one or more accounts associated with that user. The account identifier may be embodied on a payment device (e.g., a physical instrument used for conducting payment transactions, such as a payment card, a credit card, a debit card, a gift card, and/or the like) and/or may be electronic information communicated to the user that the user may use for electronic payment transactions. In some non-limiting embodiments or aspects, the account identifier may be an original account identifier, where the original account identifier was provided to a user at the creation of the account associated with the account identifier. In some non-limiting embodiments or aspects, the account identifier may be a supplemental account identifier, which may include an account identifier that is provided to a user after the original account identifier was provided to the user. For example, if the original account identifier is forgotten, stolen, and/or the like, a supplemental account identifier may be provided to the user. In some non-limiting embodiments or aspects, an account identifier may be directly or indirectly associated with an issuer institution such that an account identifier may be a token that maps to a PAN or other type of account identifier. Account identifiers may be alphanumeric, any combination of characters and/or symbols, and/or the like.

As used herein, the term "token" may refer to an account identifier of an account that is used as a substitute or replacement for another account identifier, such as a PAN. Tokens may be associated with a PAN or other original account identifier in one or more data structures (e.g., one or more databases) such that they may be used to conduct a payment transaction without directly using an original account identifier. In some non-limiting embodiments or aspects, an original account identifier, such as a PAN, may be associated with a plurality of tokens for different individuals or purposes. In some non-limiting embodiments or aspects, tokens may be associated with a PAN or other account identifiers in one or more data structures such that they can be used to conduct a transaction without directly using the PAN or the other account identifiers. In some examples, an account identifier, such as a PAN, may be associated with a plurality of tokens for different uses or different purposes.

As used herein, the term "merchant" may refer to one or more entities (e.g., operators of retail businesses) that provide goods, services, and/or access to goods and/or services, to a user (e.g., a customer, a consumer, and/or the like) based on a transaction such as a payment transaction. As used herein, the term "merchant system" may refer to one or more computer systems operated by or on behalf of a merchant, such as a server executing one or more software applications. As used herein, the term "product" may refer to one or more goods and/or services offered by a merchant.

As used herein, the term "point-of-sale (POS) device" may refer to one or more electronic devices, which may be used by a merchant to conduct a transaction (e.g., a payment transaction) and/or process a transaction. Additionally or alternatively, a POS device may include peripheral devices, card readers, scanning devices (e.g., code scanners and/or the like), Bluetooth® communication receivers, near-field communication (NFC) receivers, radio frequency identification (RFID) receivers, and/or other contactless transceivers or receivers, contact-based receivers, payment terminals, and/or the like.

As used herein, the term "point-of-sale (POS) system" may refer to one or more client devices and/or peripheral devices used by a merchant to conduct a transaction. For example, a POS system may include one or more POS devices and/or other like devices that may be used to conduct a payment transaction. In some non-limiting embodiments or aspects, a POS system (e.g., a merchant POS system) may include one or more server computers programmed or configured to process online payment transactions through webpages, mobile applications, and/or the like.

As used herein, the term "transaction service provider" may refer to an entity that receives transaction authorization requests from merchants or other entities and provides guarantees of payment, in some cases through an agreement between the transaction service provider and an issuer institution. In some non-limiting embodiments or aspects, a transaction service provider may include a credit card company, a debit card company, a payment network such as Visa®, MasterCard®, AmericanExpress®, or any other entity that processes transaction. As used herein, the term "transaction service provider system" may refer to one or more computer systems operated by or on behalf of a transaction service provider, such as a transaction service provider system executing one or more software applications. A transaction service provider system may include one or more processors and, in some non-limiting embodiments or aspects, may be operated by or on behalf of a transaction service provider.

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like operated by or on behalf of a payment gateway.

As used herein, the term "computing device" may refer to one or more electronic devices configured to process data. A computing device may, in some examples, include the necessary components to receive, process, and output data, such as a processor, a display, a memory, an input device, a network interface, and/or the like. A computing device may be a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. A computing device may also be a desktop computer or other form of non-mobile computer.

As used herein, the terms "client" and "client device" may refer to one or more computing devices that access a service made available by a server. In some non-limiting embodiments or aspects, a "client device" may refer to one or more devices that facilitate payment transactions, such as one or more POS devices used by a merchant. In some non-limiting embodiments or aspects, a client device may include a computing device configured to communicate with one or more networks and/or facilitate payment transactions such as, but not limited to, one or more desktop computers, one or more mobile devices, and/or other like devices.

As used herein, the term "server" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., servers, point-of-sale (POS) devices, mobile devices, and/or the like) directly or indirectly communicating in the network environment may constitute a "system." Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

Non-limiting embodiments or aspects of the present disclosure are directed to systems, methods, and computer program products for remote authorization of payment transactions. For example, a computer-implemented method in accordance with the present disclosure may include: receiving, with at least one processor, transaction data for a transaction from a mobile device controlled by a requesting user, the transaction data comprising a transaction value and a user identifier, generating, with at least one processor, a payment request message based on the transaction data, transmitting, with at least one processor, the payment request message to a first plurality of mobile devices, determining, with at least one processor, if at least one payment response message is received from at least one mobile device of the first plurality of mobile devices within a first time period, in response to determining that the at least one payment response message is not received within the first time period, transmitting, with at least one processor, the payment request message to a second plurality of mobile devices different from the first plurality of mobile devices, receiving, with at least one processor, a payment response message from a mobile device of the second plurality of mobile devices, the payment response message including an indication that the transaction is authorized, and, in response to receiving the payment response message including the indication that the transaction is authorized, processing the transaction using a payment account associated with the mobile device that transmitted the payment response message.

By virtue of the above-noted features, systems processing payment transactions (e.g., transaction service provider systems, payment gateway systems, and/or the like) may verify that a requesting user that has initiated a payment transaction involving an account that is not issued to the requesting user is indeed permitted to do so. This, in turn, enables the systems processing such payment transactions to forego additional analysis of the payment transaction (e.g., to determine if the payment transaction is fraudulent) and, as a result, reduce the amount of computing resources consumed in the process of determining whether the payment transaction is valid. Additionally, the systems processing such payment transactions may not be subject to repeated attempts by the requesting user to initiate and complete the payment transaction using the account that is not issued to the requesting user. Since these repeated attempts may no longer be necessary since the requesting user will know with a greater degree of certainty whether the payment transaction is approved or not approved, systems processing payment transactions may advance to a subsequent payment transaction in less time than would otherwise be needed.

Referring now to FIG. 1, illustrated is a diagram of an example environment 100 in which devices, systems, and/or methods, described herein, may be implemented. As shown in FIG. 1, environment 100 includes transaction service provider system 102, merchant system 104, user device 106, one or more mobile devices 108-1-108-n, one or more mobile devices 110-1-110-n, issuer system 112, and communication network 114.

Transaction service provider system 102 may include one or more devices capable of being in communication with merchant system 104, user device 106, one or more mobile devices 108-1-108-n, one or more mobile devices 110-1-110-n, and/or issuer system 112 via communication network 114. For example, transaction service provider system 102 may include a computing device, such as a server (e.g., a transaction processing server), a group of servers, and/or other like devices. In some non-limiting embodiments, transaction service provider system 102 may be associated with a transaction service provider as described herein. In some non-limiting embodiments, transaction service provider system 102 may be capable of being in communication with a data storage device, which may be local or remote to the transaction service provider system 102. In some non-limiting embodiments, transaction service provider system 102 may be capable of receiving information from, storing information in, communicating information to, or searching information stored in the data storage device.

Merchant system 104 may include one or more devices capable of being in communication with transaction service provider system 102, user device 106, one or more mobile devices 108-1-108-n, one or more mobile devices 110-1-110-n, and/or issuer system 112 via communication network 114. Merchant system 104 may also be capable of communicating via a short-range wireless communication connection (e.g., an NFC communication connection, an RFID communication connection, a Bluetooth® communication connection, and/or the like). In some non-limiting embodiments, merchant system 104 may include a computing device, such as a server, a group of servers, a client device, a group of client devices, peripheral devices capable of being used by a merchant to conduct a transaction with a user such as a POS device and/or a POS system, and/or other like devices. In some non-limiting embodiments, merchant system 104 may be associated with a merchant as described herein.

User device 106 may include one or more devices capable of being in communication with transaction service provider system 102, merchant system 104, one or more mobile devices 108-1-108-n, one or more mobile devices 110-1-110-n, and/or issuer system 112 via communication network 114. For example, user device 106 may include one or more payment devices and/or one or more computing devices such as one or more laptop computers, one or more desktop computers, one or more mobile devices, one or more smartphones, and/or the like. In some non-limiting embodiments, user device 106 may be capable of communicating via a short range wireless communication connection. In some non-limiting embodiments or aspects, user device 106 may be associated with a user as described herein.

Mobile devices 108-1-108-n (collectively referred to as a first plurality of mobile devices 108) may include one or more devices capable of being in communication with transaction service provider system 102, merchant system 104, user device 106, one or more other mobile devices 108-1-108-n, one or more mobile devices 110-1-110-n, and/or issuer system 112 via communication network 114. For example, mobile devices 108-1-108-n may include one or more payment devices and/or one or more computing devices such as one or more laptop computers, one or more desktop computers, one or more mobile devices, one or more smartphones, and/or the like. In some non-limiting embodiments, user device 106 may be capable of communicating via a short range wireless communication connection. In some non-limiting embodiments or aspects, mobile devices 108-1-108-n may be associated with one or more first authorizing users, as described herein.

Mobile devices 110-1-110-n (collectively referred to as mobile devices 110) may include one or more devices capable of being in communication with transaction service provider system 102, merchant system 104, user device 106, one or more mobile devices 108-1-108-n, one or more other mobile devices 110-1-110-n, and/or issuer system 112 via communication network 114. For example, mobile devices 110-1-110-n may include one or more payment devices and/or one or more computing devices such as one or more laptop computers, one or more desktop computers, one or more mobile devices, one or more smartphones, and/or the like. In some non-limiting embodiments, mobile devices 110-1-110-n may be capable of communicating via a short range wireless communication connection. In some non-limiting embodiments or aspects, mobile devices mobile devices 110-1-110-n may be associated with one or more secondary authorizing users, as described herein.

Issuer system 112 may include one or more devices capable of being in communication with transaction service provider system 102, merchant system 104, user device 106, one or more mobile devices 108-1-108-n, and/or one or more mobile devices 110-1-110-n via communication network 114. For example, issuer system 112 may include a computing device, such as a server, a group of servers, and/or other like devices. In some non-limiting embodiments, issuer system 112 may be associated with an issuer institution as described herein. For example, issuer system 112 may be associated with an issuer institution that issued a credit account, debit account, credit card, debit card, and/or the like to a user associated with user device 106.

Communication network 114 may include one or more wired and/or wireless networks. For example, communication network 114 may include a cellular network (e.g., a long-term evolution (LTE) network, a third generation (3G) network, a fourth generation (4G) network, a code division multiple access (CDMA) network, and/or the like), a public land mobile network (PLMN), a local area network (LAN), a wide area network (WAN), a metropolitan area network (MAN), a telephone network (e.g., the public switched telephone network (PSTN)), a private network, an ad hoc network, a mesh network, a beacon network, an intranet, the Internet, a fiber optic-based network, a cloud computing network, and/or the like, and/or a combination of these or other types of networks.

The number and arrangement of devices and networks shown in FIG. 1 are provided as an example. There may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally or alternatively, a set of devices (e.g., one or more devices) of environment 100 may perform one or more functions described as being performed by another set of devices of environment 100.

Figure 2:
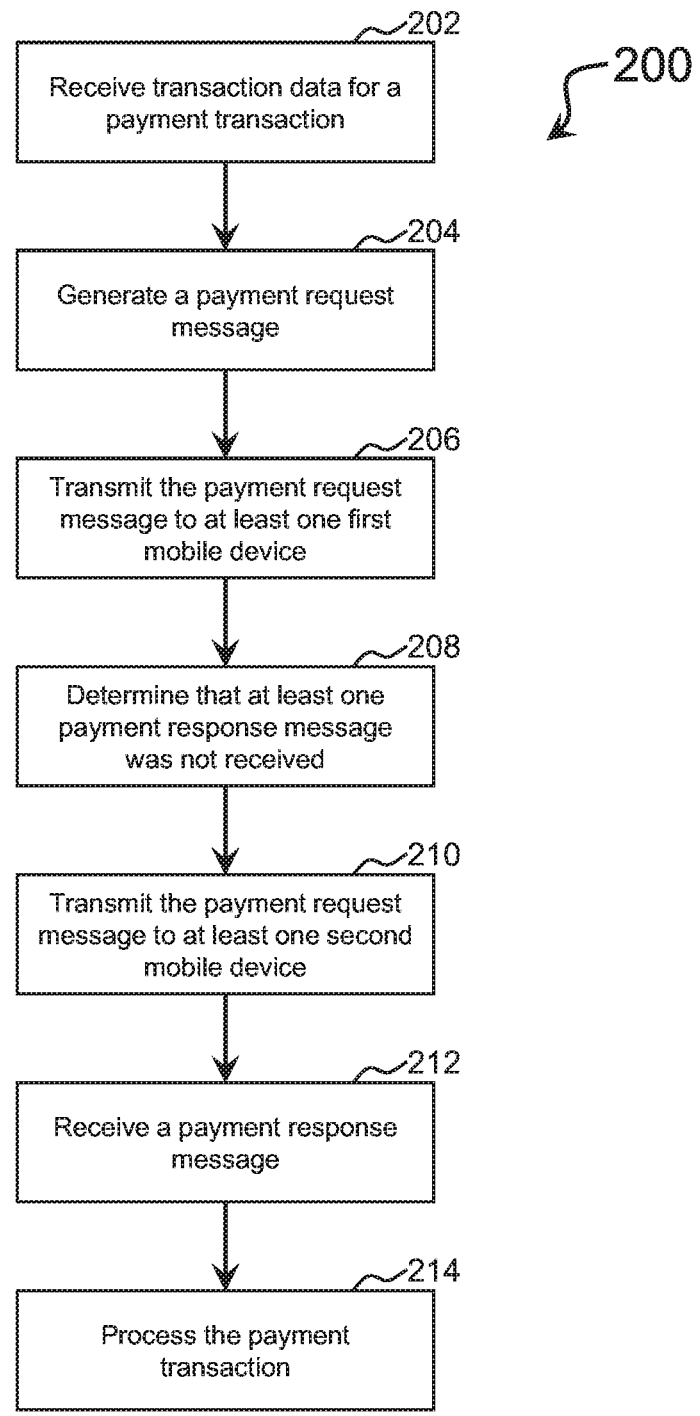
FIG. 2 is a flowchart illustrating a non-limiting embodiment of a method for remotely authorizing payment transactions according to the principles of the present disclosure.

Referring now to FIG. 2, FIG. 2 is a flowchart of a non-limiting embodiment of a process 200 for remote authorization of payment transactions. In some non-limiting embodiments, one or more of the steps of process 200 may be performed (e.g., completely, partially, and/or the like) by transaction service provider system 102 (e.g., one or more devices of transaction service provider system 102). In some non-limiting embodiments, one or more of the steps of process 200 may be performed (e.g., completely, partially, and/or the like) by another device or a group of devices separate from or including transaction service provider system 102, such as merchant system 104 (e.g., one or more devices of merchant system 104), user device 106, one or more mobile devices of the first plurality of mobile devices 108, one or more mobile devices of the second plurality of mobile devices 110, and/or issuer system 112 (e.g., one or more devices of issuer system 112).

As shown in FIG. 2, at step 202, process 200 may include receiving transaction data for a payment transaction. For example, transaction service provider system 102 may receive transaction data for a payment transaction. In such an example, transaction service provider system 102 may receive transaction data for a payment transaction from merchant system 104. In some non-limiting embodiments or aspects, transaction service provider system 102 may receive the transaction data for the payment transaction from merchant system 104 based on (e.g., in response to) merchant system 104 receiving data from user device 106 initiating the payment transaction.

In some non-limiting embodiments or aspects, the payment transaction may involve the user associated with user device 106 and the merchant associated with merchant system 104. For example, the user associated with user device 106 may engage the merchant system 104 (e.g., by bringing user device 106 in proximity to merchant system 104 such that user device 106 engages merchant system 104 and communicates data associated with the payment transaction to user device 106 such as information about the user). In some non-limiting embodiments or aspects, merchant system 104 may then generate transaction data for the payment transaction and transmit the transaction data to transaction service provider system 102. For example, merchant system 104 may generate the transaction data based on the payment transaction initiated by the requesting user associated with user device 106. In some non-limiting embodiments or aspects, the transaction data may include a transaction value and/or a user identifier associated with the requesting user involved in the payment transaction.

In some non-limiting embodiments or aspects, the transaction data may include an indication to process (e.g., an indication configured to cause transaction service provider system 102 to process) the payment transaction using a payment account. For example, the transaction data may include an indication to process (e.g., an indication configured to cause transaction service provider system 102 to process) the payment transaction using a payment account associated with the requesting user and/or a payment account associated with a first authorizing user and/or a secondary authorizing user. For example, the transaction data may include an indication to process the payment transaction using a payment account associated with the requesting user and a first authorizing user, where the first authorizing user has registered as agreeing to satisfy one or more payment transactions for the requesting user with a payment account of the first authorizing user. Additionally or alternatively, the transaction data may include an indication to process the payment transaction using a payment account associated with the requesting user and a secondary authorizing user, where the secondary authorizing user has registered as agreeing to satisfy one or more payment transactions for the requesting user with a payment account of the first authorizing user.

In some non-limiting embodiments or aspects, user device 106 may be registered as associated with (e.g., may be correlated in a database with) one or more payment accounts of each mobile device of the first plurality of mobile devices 108. For example, user device 106 may be registered with transaction service provider system 102 as associated with one or more payment accounts. In such an example, each payment account may be issued to respective first authorizing users and/or secondary authorizing users associated with each mobile device of the first plurality of mobile devices 108. When registered, each first authorizing user and secondary authorizing user may agree that the one or more payment accounts issued to the first authorizing user or the secondary authorizing user, respectively, may be used to satisfy one or more payment transactions initiated by user device 106. In some non-limiting embodiments or aspects, the first authorizing user and/or the secondary authorizing user may be associated with the requesting user (e.g., may be a family member, a friend, a roommate, a coworker, and/or the like).

In some non-limiting embodiments or aspects, the payment account identified based on the indication to process the payment transaction may identify a payment account from among a plurality of payment accounts. For example, user device 106 may be registered with a plurality of payment accounts, each of the payment accounts issued to one or more first authorizing users and/or secondary authorizing users. In such an example, where user device 106 initiates a payment transaction with merchant system 104, merchant system 104 may display a graphical user interface (GUI) and/or cause user device 106 to display a GUI prompting the requesting user to select a payment account from among the plurality of payment accounts. The requesting user may provide, either to merchant system 104 (e.g., a POS terminal and/or the like) or input to user device 106 that specifies which payment account to use during the payment transaction. In some non-limiting embodiments or aspects, the merchant system 104 may then include an indication that the payment account is selected from among the plurality of payment accounts in the transaction data for the payment transaction.

In some non-limiting embodiments or aspects, one or more devices of environment 100 may determine that the payment transaction does or does not satisfy one or more rules. For example, one or more rules may be established with transaction service provider system 102 specifying when a payment transaction involving the requesting user associated with user device 106 may be processed and/or submitted to one or more users of the first plurality of mobile devices 108 and/or the second plurality of mobile devices 110. In such an example, transaction service provider system 102 may determine, in response to receiving the transaction data from merchant system 104, that the payment transaction does or does not satisfy the one or more rules. In some non-limiting embodiments or aspects in which transaction service provider system 102 determines that the payment transaction does satisfy the one or more rules, transaction service provider system 102 may proceed and process the payment transaction. Additionally or alternatively, where transaction service provider system 102 determines that the payment transaction does satisfy the one or more rules, transaction service provider system 102 may proceed by generating and transmitting a payment request message to one or more mobile devices of the first plurality of mobile devices 108 and/or one or more mobile devices of the second plurality of mobile devices 110. In some non-limiting embodiments or aspects, where transaction service provider system 102 determines that the payment transaction does not satisfy the one or more rules, transaction service provider system 102 may generate and transmit a payment request message to one or more mobile devices of the first plurality of mobile devices 108 and/or one or more mobile devices of the second plurality of mobile devices 110. Additionally or alternatively, where transaction service provider system 102 determines that the payment transaction does not satisfy the one or more rules, transaction service provider system 102 may transmit a message to merchant system 104 and/or user device 106 indicating that the payment transaction is not authorized (e.g., does not satisfy the one or more rules, is denied, and/or the like).

In some non-limiting embodiments or aspects, transaction service provider system 102 may determine that the payment transaction does not satisfy one or more rules by determining that an upper limit for transactions involving the requesting user will be exceeded if the payment transaction is authorized. In some non-limiting embodiments or aspects, transaction service provider system 102 may determine that the payment transaction does not satisfy one or more rules by determining that an upper limit of a plurality of payment transactions involving the requesting user will be exceeded if the transaction is authorized. In some non-limiting embodiments or aspects, transaction service provider system 102 may determine that the payment transaction does not satisfy one or more rules by determining that an amount of payment transactions authorized within a predetermined time period involving the requesting user will be exceeded if the payment transaction is authorized. In some non-limiting embodiments or aspects, transaction service provider system 102 may determine that the payment transaction does not satisfy one or more rules by determining that a location associated with the transaction is not associated with a defined area (e.g., that user device 106 is not within the defined area). In such an example, the defined area may be a geographical area, a geographic region, a town, and/or the like, and may be predetermined or dynamically determined.

As shown in FIG. 2, at step 204, process 200 may include generating a payment request message. For example, transaction service provider system 102 may generate a payment request message. In such an example, transaction service provider system 102 may generate the payment request message based on receiving the transaction data for the payment transaction from merchant system 104. In some non-limiting embodiments or aspects, transaction service provider system 102 may generate the payment request message based on receiving the transaction data and determining, based on the payment transaction, that the one or more rules are not satisfied. In some non-limiting embodiments or aspects, the payment request message may include the transaction value and/or the user identifier.

In some non-limiting embodiments or aspects, each mobile device of the first plurality of mobile devices 108 may be associated with a first authorizing user and/or a secondary authorizing user. For example, a first authorizing user may be a family member, a friend, a roommate, a coworker, and/or the like that has agreed to satisfy payment transactions and/or to be contacted to satisfy payment transactions involving the requesting user associated with user device 106. In some non-limiting embodiments or aspects, the first authorizing user and/or the secondary authorizing user may be associated with a payment account. For example, the first authorizing user and/or the secondary authorizing user may be associated with a payment account maintained by issuer system 112. In some non-limiting embodiments or aspects, one or more mobile devices of the first plurality of mobile devices 108 that are associated with the first authorizing user and/or the secondary authorizing user may be associated with one or more mobile devices of the second plurality of mobile devices 110, as described herein.

As shown in FIG. 2, at step 206, process 200 may include transmitting the payment request message to at least one first mobile device. For example, transaction service provider system 102 may transmit the payment request message to at least one first mobile device of the first plurality of mobile devices 108. Additionally or alternatively, merchant system 104 and/or user device 106 may transmit the payment request message to the at least one mobile device of the first plurality of mobile devices 108.

In some non-limiting embodiments or aspects, transaction service provider system 102 may transmit the payment request message to merchant system 104 and, based on receiving the payment request message from transaction service provider system 102, merchant system 104 may transmit the payment request message to user device 106. For example, merchant system 104 may transmit the payment request message to user device 106 via a short-range wireless communication connection. User device 106 may then transmit the payment request message to one or more mobile devices from among the first plurality of mobile devices 108 based on receiving the payment request message from merchant system 104. For example, user device 106 may receive the payment request message from merchant system 104 and determine, based on the data included in the payment request message, to transmit the payment request message to one or more mobile devices of the first plurality of mobile devices 108. Additionally or alternatively, user device 106 may display a prompt to cause the requesting user to provide input identifying which mobile devices of the first plurality of mobile devices to transmit the payment request message to based on receiving the payment request message. In such an example, user device 106 may then transmit the payment request message to one or more mobile devices of the first plurality of mobile devices based on receiving input from the requesting user at user device 106.

As shown in FIG. 2, at step 208, process 200 may include determining that at least one payment response message was not received. For example, transaction service provider system 102 may determine that at least one payment response message was not received. In such an example, transaction service provider system 102 may determine that the at least one payment response message was not received from one or more mobile devices of the first plurality of mobile devices 108. For example, transaction service provider system 102 may determine that the at least one payment response message was not received from one or more mobile devices of the first plurality of mobile devices 108 to which the payment request message was transmitted.

In some non-limiting embodiments or aspects, transaction service provider system 102 may receive the at least one payment response from one or more mobile devices of the first plurality of mobile devices 108. In such an example, the one or more mobile devices of the first plurality of mobile devices 108 may generate the at least one payment response based on receiving input at the one or more mobile devices of the first plurality of mobile devices 108 from the first authorizing user and/or the secondary authorizing user. The input may specify whether or not the first authorizing user and/or the secondary authorizing user has approved use of the payment account associated with the one or more mobile devices of the first plurality of mobile devices 108 for use when satisfying the payment transaction.

In some non-limiting embodiments or aspects, transaction service provider system 102 may determine that the at least one payment response message was not received within a first time period (e.g., a first time period that may be dynamically adjusted depending on one or more factors involved in a payment transaction such as, the POS system involved in the payment transaction, the time of day during which the payment transaction was initiated, and/or the like, as described herein). For example, transaction service provider system 102 may determine that the at least one payment response message was not received within a first time period by either transaction service provider system 102, merchant system 104 and/or user device 106. In some non-limiting embodiments or aspects, transaction service provider system 102 may determine the first time period. For example, transaction service provider system 102 may determine the first time period based on merchant data associated with merchant system 104. In such an example, transaction service provider system 102 may receive the merchant data prior to initiation of the payment transaction and/or during the payment transaction from merchant system 104. The merchant data may include traffic data associated with traffic at a POS device of merchant system 104 (e.g., an average amount of transactions initiated at the POS device, an amount of transactions initiated at the POS device within a time period, an amount of transactions initiated at the POS device on a particular day, and/or the like). In some non-limiting embodiments or aspects, the first time period may be a predetermined time period.

As shown in FIG. 2, at step 210, process 200 may include transmitting the payment request message to at least one second mobile device. For example, transaction service provider system 102 and/or user device 106 may transmit the payment request message to at least one second mobile device of the second plurality of mobile devices 110. In some non-limiting embodiments or aspects, transaction service provider system 102 and/or user device 106 may transmit the payment request message to at least one second mobile device of the second plurality of mobile devices 110 based on (e.g., in response to) determining that at least one payment response message was not received from at least one mobile device of the first plurality of mobile devices within the first time period. In some non-limiting embodiments or aspects, transaction service provider system 102 may re-transmit the payment request message to merchant system 104 to cause merchant system 104 to retransmit the payment request message to user device 106, thereby causing user device 106 to transmit the payment request message to the at least one second mobile device of the second plurality of mobile devices 110.

In some non-limiting embodiments or aspects, the second plurality of mobile devices 110 may be at least partially different from the first plurality of mobile devices 108. For example, each mobile device of the second plurality of mobile devices 110 may be associated with a back-up authorizing user (e.g., an individual and/or organization of individuals that agree to authorize payment transactions on behalf of one or more first authorizing users and/or secondary authorizing users associated with one or more mobile devices of the first plurality of mobile devices 108). In some non-limiting embodiments or aspects, the at least one back-up authorizing user may register via one or more mobile devices of the second plurality of mobile devices 110 with transaction service provider system 102 and one or more mobile devices of the first plurality of mobile devices 108.

In some non-limiting embodiments or aspects, during registration, the back-up authorizing user may be permitted to receive payment request messages via one or more mobile devices of the second plurality of mobile devices 110 and authorize the payment transaction involving the requesting user on behalf of the first authorizing user and/or the secondary authorizing user associated with one or more mobile devices of the first plurality of mobile devices 108. For example, the back-up authorizing user may receive the payment request message via a mobile device of the second plurality of mobile devices 110 and, upon review of the transaction details (e.g., via a GUI of the mobile device of the second plurality of mobile devices 110), may provide input to the mobile device of the second plurality of mobile devices 110 including an indication that the payment transaction is authorized or not authorized. Where the indication identifies the payment transaction as authorized, the payment transaction may be processed using the payment account associated with the first authorizing user and/or the secondary authorizing user associated with the respective mobile device of the first plurality of mobile devices. Additionally or alternatively, where the indication identifies the payment transaction as not authorized, transaction service provider system 102 may terminate the payment transaction and provide a confirmation message to merchant system 104 and/or user device 106 that the payment transaction is not authorized.

As shown in FIG. 2, at step 212, process 200 may include receiving a payment response message. For example, transaction service provider system 102 may receive the payment response message from one or more mobile devices of the second plurality of mobile devices 110. In such an example, the payment response message received from the one or more mobile devices of the second plurality of mobile devices 110 may include an indication that the payment transaction is approved or not approved by the back-up authorizing user.

As shown in FIG. 2, at step 214, process 200 may include processing a payment transaction. For example, transaction service provider system 102 may process the payment transaction. In such an example, transaction service provider system 102 may process the payment transaction based on determining that the indication identifies the payment transaction as a payment transaction to be processed. Additionally or alternatively, transaction service provider system 102 may forego processing the payment transaction based on determining that the indication does not identify the payment transaction as a payment transaction that should be processed.

In some non-limiting embodiments or aspects, transaction service provider system 102 may determine a payment account when processing the payment transaction. For example, transaction service provider system 102 may determine the payment account based on the user identifier included in the payment request message. Additionally or alternatively, transaction service provider system 102 may determine the payment account based on receiving the payment response message from a mobile device of the second plurality of mobile devices 110. For example, transaction service provider system 102 may determine the payment account from among a plurality of payment accounts associated with one or more first authorizing users and/or secondary authorizing users associated with the first plurality of mobile devices 108, the one or more payment accounts registered with the first authorizing user and/or the secondary authorizing user prior to or during the payment transaction. In some non-limiting embodiments or aspects, transaction service provider system 102 may determine the payment account based on determining that the payment response message was received from a mobile device of the second plurality of mobile devices. For example, transaction service provider system 102 may determine the payment account based on determining that the payment response message was received from a mobile device of the second plurality of mobile devices. In such an example, where the payment account is controlled by a first authorizing user and/or a secondary authorizing user of a mobile device, the second plurality of mobile devices 110 may be registered as allowing the back-up user associated with a mobile device of the second plurality of mobile devices to authorize transactions on behalf of the first authorizing user and/or the secondary authorizing user.

In some non-limiting embodiments or aspects, when processing the payment transaction, transaction service provider system 102 may generate an authorization request message including the transaction data and/or payment account data associated with the payment account associated with the authorization of the payment transaction. In such an example, transaction service provider system 102 may transmit the authorization request message to issuer system 112. For example, transaction service provider system 102 may transmit the authorization request message to issuer system 112 based on transaction service provider system 102 determining that issuer system 112 is associated with the payment account involved in the payment transaction.

In some non-limiting embodiments or aspects, transaction service provider system 102 may receive an authorization response message from issuer system 112. For example, transaction service provider system 102 may receive an authorization response message from issuer system 112 based on issuer system 112 determining whether the payment transaction is approved or not approved. In such an example, issuer system 112 may generate and transmit the authorization response message, where the authorization response message includes an indication that identifies whether or not the payment transaction message is approved or not approved. In some non-limiting embodiments or aspects, transaction service provider system 102 may transmit a confirmation message to merchant system 104 and/or user device 106 indicating that the payment transaction was approved or not approved. In some non-limiting embodiments or aspects, upon receipt of the confirmation message, merchant system 104 may transmit data to cause a display of user device 106 to display a GUI that identifies the payment transaction as approved or not approved to the requesting user (e.g., via a POS device associated with merchant system 104).

Figure 3:
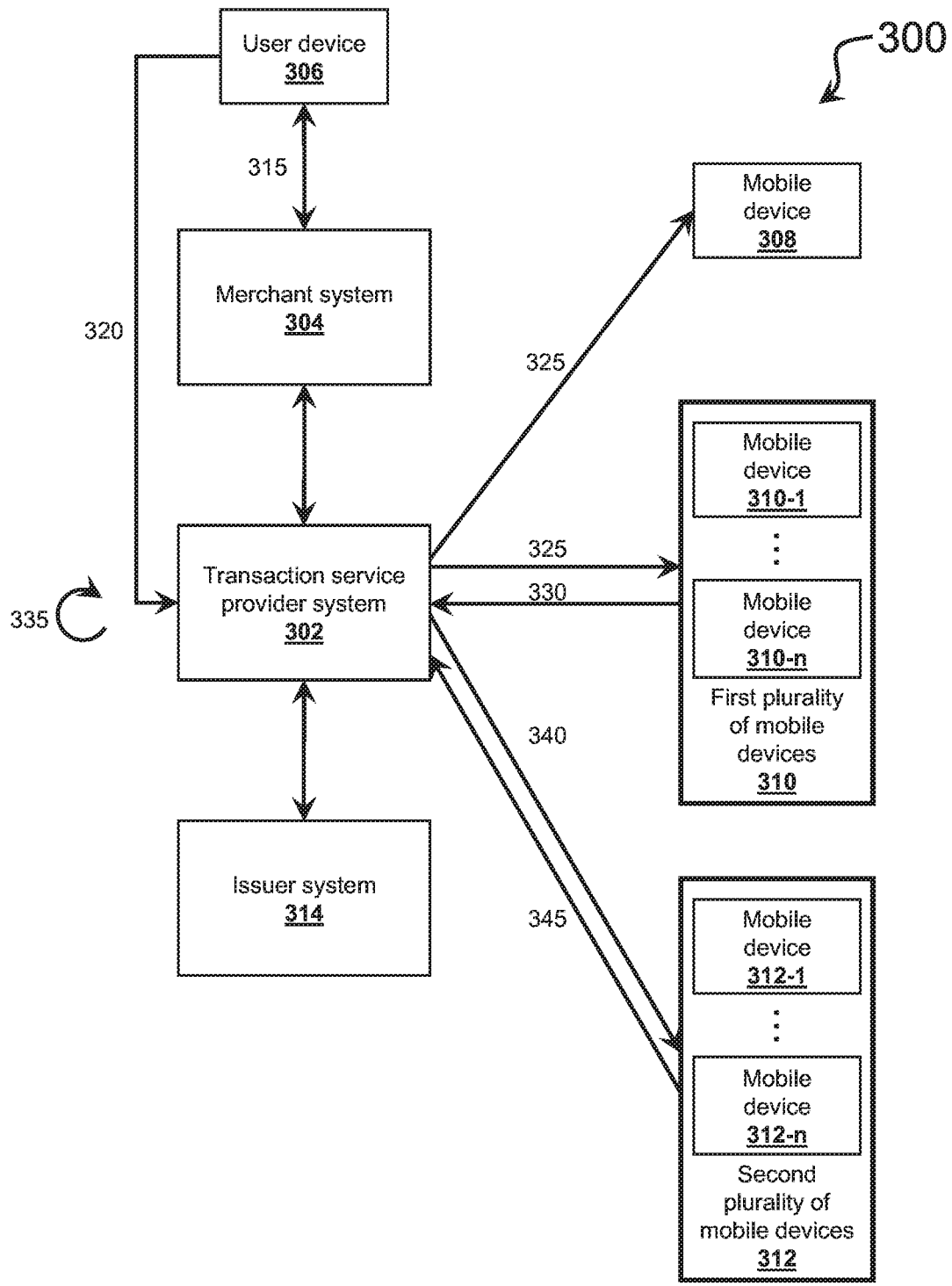
FIG. 3 is a flowchart illustrating a non-limiting embodiment of a method for remotely authorizing payment transactions according to the principles of the present disclosure.

FIG. 3 is a diagram of an overview of a non-limiting embodiment of an implementation 300 relating to a method for remote authorization of a payment transaction. As shown in FIG. 3, implementation 300 may include transaction service provider system 302, merchant system 304, user device 306, mobile device 308, a first plurality of mobile devices 310, a second plurality of mobile devices 312, and issuer system 314. In some non-limiting embodiments or aspects, transaction service provider system 302 may be the same or similar to transaction service provider system 102. In some non-limiting embodiments or aspects, merchant system 304 may be the same or similar to merchant system 104. In some non-limiting embodiments or aspects, user device 306 may be the same or similar to user device 106. In some non-limiting embodiments or aspects, mobile device 308 may be the same or similar to one or more mobile devices of the first plurality of mobile devices 108 (e.g., mobile device 308 may be associated with a first authorizing user, see FIG. 1). In some non-limiting embodiments or aspects, the first plurality of mobile devices 310 may be the same or similar to one or more mobile devices of the first plurality of mobile devices 108 (e.g., one or more of the mobile devices of the first plurality of mobile device 310 may be associated with one or more first authorizing users and/or one or more secondary authorizing users, see FIG. 1). In some non-limiting embodiments or aspects, the second plurality of mobile devices 312 may be the same or similar to the second plurality of mobile devices 110 (e.g., the second plurality of mobile devices may be associated with one or more back-up authorizing users, see FIG. 1). In some non-limiting embodiments or aspects, issuer system 314 may be the same or similar to issuer system 112.

As shown by reference number 315 in FIG. 3, user device 306 may communicate via a short-range wireless communication connection with merchant system 304 (e.g., a POS system) to initiate a payment transaction. User device 306 may be associated with one or more PANs. For example, user device 306 may be associated with one or more PANs that are further associated with mobile device 308 and/or one or more mobile devices of a first plurality of mobile devices 310. In some non-limiting embodiments or aspects, merchant system 304 may be operated by a merchant (e.g., an individual and/or an automated system associated with a merchant as described herein).

In some non-limiting embodiments or aspects, user device 306, mobile device 308, each mobile device of the first plurality of mobile devices 310, and each mobile device of the second plurality of mobile devices 312 may register with transaction service provider system 302 and/or with merchant system 304. For example, user device 306, mobile device 308, each mobile device of the first plurality of mobile devices 310, and each mobile device of the second plurality of mobile devices 312 may register as being associated with one or more PANs. In one example, the first mobile device 308 and each mobile device of the first plurality of mobile devices 310 may be associated with one or more PANs corresponding to accounts issued to the users of the respective mobile devices. In another example, each mobile device of the second plurality of mobile devices may be associated with one or more PANs (e.g., permitted to approve payment transactions on behalf of users) that correspond to the first mobile device 308 and/or one or more mobile device of the first plurality of mobile devices 310. In some non-limiting embodiments or aspects, user device 306 may register with transaction service provider system 302 to be permitted to initiate a payment transaction associated with a PAN, the PAN issued to a first authorizing user and/or a secondary authorizing user that is associated with mobile device 308 and/or each mobile device of the first plurality of mobile devices 310.

During registration, the users of mobile device 308 and/or the first plurality of mobile devices 310 may set one or more rules associated with pre-approval of a payment transaction. For example, a first rule may include requiring confirmation of approval where a payment transaction exceeds a predetermined value. In another example, a second rule may include requiring confirmation of approval where a payment transaction would cause a total amount of payment transactions initiated within a predetermined time period to exceed a predetermined amount of payment transactions (e.g., a transaction count limit). In another example, a third rule may include requiring confirmation of approval where a payment transaction is initiated outside of a defined area. In another example, a fourth rule may include requiring that transaction service provider system 302 determine that a time period has elapsed prior to transmitting a payment request message to one or more mobile devices of the second plurality of mobile devices 312.

Merchant system 304 may scan identifiers associated with one or more items involved in the payment transaction. Merchant system 304 may then receive input from a requesting user associated with user device 306 specifying that the payment transaction is a remote payment transaction and, based on receiving the input, merchant system 304 may communicate with user device 306 during a handshake to establish a protocol by which information will be communicated between user device 306 and merchant system 304 during the payment transaction. After a successful handshake, merchant system 304 may transmit data to user device 306 including amount data associated with a transaction amount, tax data associated with a tax amount, line item cost data associated with a cost for each item involved in the payment transaction, store location data associated with an identifier of the store location associated with merchant system 304, terminal identification data associated with a POS system identifier, a merchant identifier associated with the merchant, and/or merchant system data associated with a merchant system, such as a merchant back office server. In some non-limiting embodiments or aspects, the merchant system 304 (e.g., a computing device in communication with a POS system of the merchant, a webserver associated with the merchant, and/or the like) may be a separate computing device and/or may be a computing device that is integrated into merchant system 304 and/or transaction service provider system 302. The merchant back office server may be configured to communicate with transaction service provider system 302. In some non-limiting embodiments or aspects, data communicated between merchant system 304 and user device 306 may be encoded in any of JSON, Avro, XML, or any other structural data format. Additionally or alternatively, the data communicated between merchant system 304 and user device 306 may be cryptographically signed by merchant system 304 and/or user device 306. In some non-limiting embodiments or aspects, user device 306 may include a pre-installed application and/or operating system (e.g., Apple's iOS®, Android®, Fuchsia, and/or the like) that receives data communicated from merchant system 304 to user device 306.

As shown by reference number 320 in FIG. 3, user device 306 may transmit data associated with the payment transaction to transaction service provider system 302. For example, an application executed on user device 306 may cause data communicated to user device 306 from merchant system 304 to be transmitted to one or more mobile devices by transmitting the data communicated to user device 306 from merchant system 304 to transaction service provider system 302. Transaction service provider system 302 may then communicate with one or more mobile devices (e.g., mobile device 308, one or more mobile devices of the first plurality of mobile devices 310, and/or one or more mobile devices of the second plurality of mobile devices 312) in response to receiving the data associated with the payment transaction from user device 306. For example, transaction service provider system 302 may communicate with the one or more mobile devices via, without limitation, push notifications (e.g., Apple Push Notification services (APNs) for iOS smartphones or Firebase Cloud Messaging (FCM) for both iOS, Android, and/or Fuchsia smartphones). In such instances, one or more users (e.g., one or more requesting users) may authenticate their identity (e.g., by providing as input to user device 306 a PIN and/or biometric data associated with a biometric input) to ensure the validity of the data communicated prior to transmission.

In some non-limiting embodiments or aspects, merchant system 304 may transmit data associated with the payment transaction to transaction service provider system 302. For example, where user device 306 communicates to merchant system 304 that user device 306 cannot establish communication with transaction service provider system 302, merchant system 304 may transmit the data associated with the payment transaction to transaction service provider system 302. In such an example, merchant system 304 may prompt the requesting user associated with user device 306 to provide input to merchant system 304 associated with identifying information of the requesting user. The identifying information may include, for example, a mobile telephone number and/or a one-time password. In some non-limiting embodiments or aspects, the one-time password may be generated by user device 306 while not in communication with transaction service provider system 302 (e.g., while offline). In some non-limiting embodiments or aspects, user device 306 may be synchronized with transaction service provider system 302 prior to user device 306 being unable to communicate with transaction service provider system 302, thereby enabling both transaction service provider system 302 and user device 306 to independently derive the one-time password.

In some non-limiting embodiments or aspects, merchant system 304 may cause a POS system of merchant system 304 to display a prompt indicating that the payment transaction is being authorized. For example, transaction service provider system 302 may transmit a message to user device 306 and/or merchant system 304 including data associated with a prompt that, when received by user device 306 and/or merchant system 304 cause user device 306 and/or merchant system 304 to display a GUI indicating that the payment transaction is being authorized.

As shown by reference number 325 in FIG. 3, transaction service provider system 302 may transmit the data associated with the payment transaction included in a payment request message to mobile device 308 and one or more mobile devices of the first plurality of mobile devices 310. In such an example, mobile device 308 and/or the one or more mobile devices of the first plurality of mobile devices 310 may check the data for integrity and display a prompt associated with the payment transaction to the first authorizing user associated with mobile device 308 and/or the secondary authorizing users associated with the one or more mobile devices of the first plurality of mobile devices 310. In some non-limiting embodiments or aspects, mobile device 308 and/or the one or more mobile devices of the first plurality of mobile devices 310 may include a mobile wallet application that receives the data associated with the payment transaction and displays the prompt associated with the payment transaction. Mobile device 308 may then receive input specifying that the payment transaction is approved or not approved and, based on receiving the input, transmit a message to transaction service provider system 302 including an indication that allows the transaction service provider system 302 to determine that the payment transaction is approved or not approved. The message including the indication that the payment transaction is approved or not approved may be transmitted via the mobile wallet application via a tokenized card packet. In some non-limiting embodiments or aspects, the message may include an identifier of mobile device 308.

As shown by reference number 330 in FIG. 3, the one or more mobile devices of the first plurality of mobile devices 310 may receive input indicating that the payment transaction is approved or not approved and, based on receiving the input, transmit a message to transaction service provider system 302 including an indication that the payment transaction is approved or not approved. The message including the indication that the payment transaction is approved or not approved may be transmitted via the mobile wallet application via a tokenized card packet. In some non-limiting embodiments or aspects, the message may include an identifier of the one or more mobile devices of the first plurality of mobile devices 310.

In some non-limiting embodiments or aspects, transaction service provider system 302 may record an identifier associated with mobile device 308 (e.g., in a database associated with transaction service provider system 302) and transmit a message including an indication of whether the payment transaction is approved or not approved to merchant system 304. In such an example, merchant system 304 may transmit an authorization request message (e.g., to transaction service provider system 302) associated with the payment transaction, the authorization request message including transaction data associated with the payment transaction (e.g., one or more of amount data associated with a transaction amount, tax data associated with a tax amount, line item cost data associated with a cost for each item involved in the payment transaction, store location data associated with an identifier of the store location associated with merchant system 304, terminal identification data associated with a POS system identifier, a merchant identifier associated with the merchant, and/or merchant system data associated with a merchant system, such as a merchant back office server), to transaction service provider system 302. Merchant system 304 may then receive an authorization response message including an indication that identifies whether the payment transaction is approved or not approved. In some non-limiting embodiments or aspects, merchant system 304 may transmit a confirmation message to user device 306 including an indication as to whether the payment transaction was approved or not approved. The confirmation message may include receipt data associated with a receipt for the payment transaction.

As shown by reference number 335 in FIG. 3, transaction service provider system 302 may determine that a payment response message was not received from mobile device 308 within a first time period. For example, transaction service provider system 302 may determine that the payment response message was not received from mobile device 308 within the first time period based on a measured amount of network and/or Internet latency when communicating with one or more devices of FIG. 3, a measured amount of latency associated with one or more smartphone notification systems (e.g., Google Firebase, Apple Push Notification Service, and/or the like), response times associated with receipt of one or more payment response messages after one or more corresponding payment request messages were transmitted, and/or times according to which a POS system of merchant system 304 will timeout during a payment transaction. In some non-limiting embodiments or aspects, transaction service provider system 302 and/or merchant system 304 may determine the first time period.

Additionally or alternatively, transaction service provider system 302 may determine that a payment response message was not received from one or more mobile devices of the first plurality of mobile devices 310 within a second time period. For example, transaction service provider system 302 may determine that a payment response message was not received from one or more mobile devices of the first plurality of mobile devices 310 within a second time period based on (e.g., after and/or in response to) determining that a payment response message was not received from mobile device 308 and/or one or more mobile devices of the first plurality of mobile devices 310 within the first time period. In some non-limiting embodiments or aspects, transaction service provider system 302 may determine that the payment response message was not received from one or more mobile devices of the first plurality of mobile devices 310 within the second time period based on a measured amount of network and/or Internet latency when communicating with one or more devices of FIG. 3, a measured amount of latency associated with one or more smartphone notification systems (e.g., Google Firebase, Apple Push Notification Service, and/or the like), response times associated with receipt of one or more payment response messages after one or more corresponding payment request messages were transmitted, and/or times according to which a POS system of merchant system 304 will timeout during a payment transaction. In some non-limiting embodiments or aspects, transaction service provider system 302 and/or merchant system 304 may determine the second time period.

As shown by reference number 340 in FIG. 3, where no payment response messages are received from mobile device 308 and the mobile devices of the first plurality of mobile devices 310 that include an indication that the payment transaction is approved, transaction service provider system 302 may transmit the payment request message to one or more mobile devices of the second plurality of mobile devices 312 based on the indication.

As shown by reference number 345 in FIG. 3, one or more mobile devices of the second plurality of mobile devices 312 may transmit payment response messages including an indication that identifies whether the payment transaction is approved or not approved on behalf of one or more first authorizing users associated with mobile device 308 and/or one or more secondary authorizing users associated with one or more mobile devices of the first plurality of mobile devices 310. In examples where more than one payment response messages are received by transaction service provider system 302 including an indication that identifies the payment transaction as being authorized on behalf of one or more first authorizing users associated with mobile device 308 and/or one or more secondary authorizing users associated with one or more mobile devices of the first plurality of mobile devices 310, transaction service provider system 302 may cause the payment transaction to be processed based on the first payment response message received that includes an indication that the payment transaction is authorized. Where the payment response message is received from one or more mobile devices of the second plurality of mobile devices 312, the PAN which is accepted by transaction service provider system 302 as approved to be used during the payment transaction may also be involved in a separate payment transaction involving a user associated with the one or more mobile devices of the second plurality of mobile devices 312. In some non-limiting embodiments or aspects, transaction service provider system 302 may determine a value to be transmitted to one or more users of the mobile devices of the second plurality of mobile devices 312 to compensate for review and approval and/or denial of the payment transaction. In some non-limiting embodiments or aspects, transaction service provider system 302 may maintain a ledger of values to be transmitted to one or more users of the mobile devices of the second plurality of mobile devices 312 and may generate an authorization request message periodically (e.g., monthly, quarterly, and/or the like) based on determining that one or more users associated with mobile device 308 and/or one or more mobile device of the first plurality of mobile devices 310 were involved in one or more transactions that were approved by one or more back-up users operating the one or more mobile devices of the second plurality of mobile devices.

Figure 4:
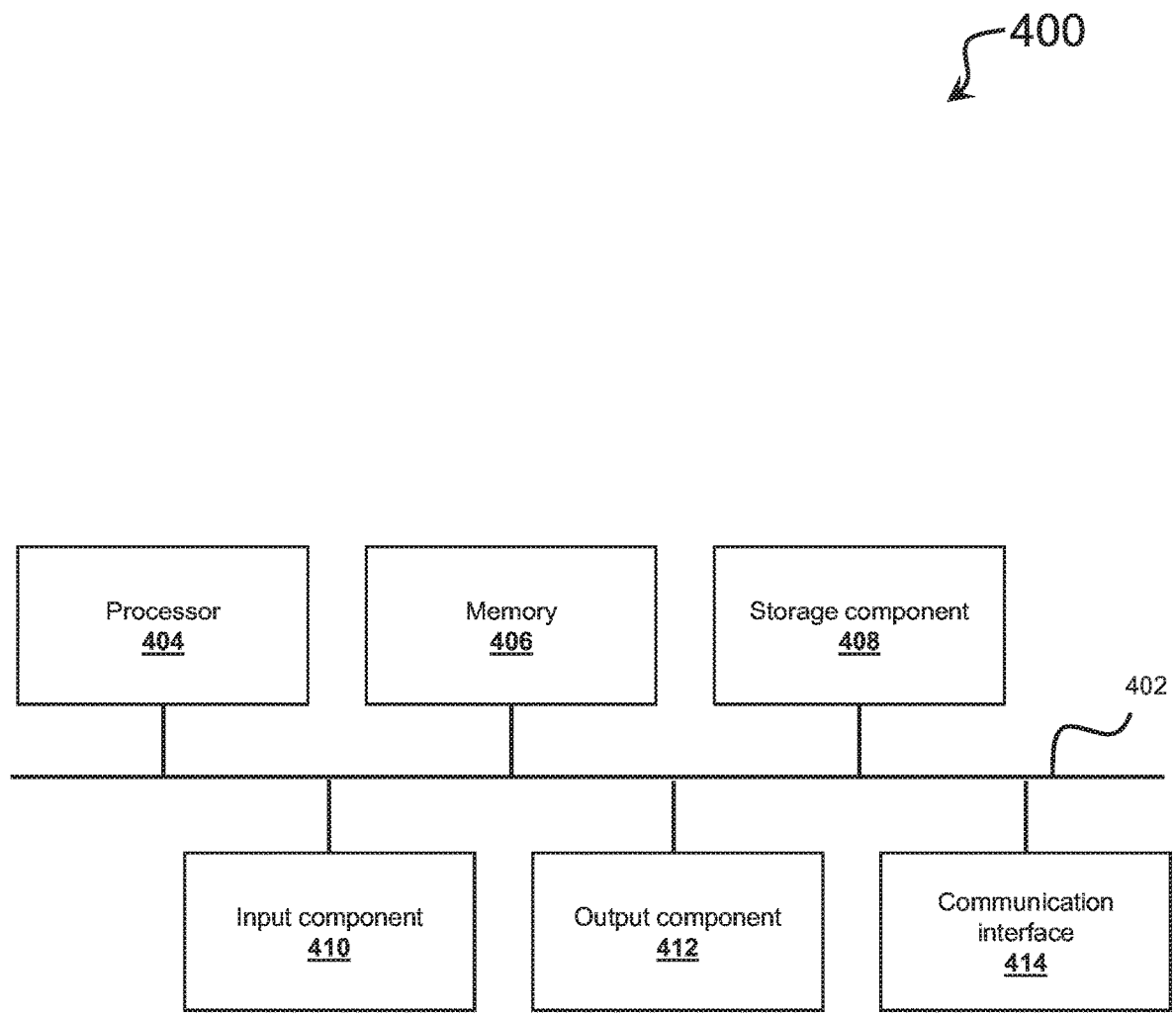
FIG. 4 is a diagram of a non-limiting embodiment of components of one or more devices of FIG. 1.

FIG. 4 is a diagram of example components of a device 400. Device 400 may correspond to one or more devices of transaction service provider system 102, merchant system 104, user device 106, one or more mobile devices 108-1-108-n, one or more mobile devices 110-1-110-n, issuer system 112, and/or communication network 114. In some non-limiting embodiments, transaction service provider system 102, merchant system 104, user device 106, one or more mobile devices 108-1-108-n, one or more mobile devices 110-1-110-n, issuer system 112, and/or communication network 114 may include at least one device 400 and/or at least one component of device 400. As shown in FIG. 4, device 400 may include bus 402, processor 404, memory 406, storage component 408, input component 410, output component 412, and communication interface 414.

Bus 402 may include a component that permits communication among the components of device 400. In some non-limiting embodiments, processor 404 may be implemented in hardware, software, or a combination of hardware and software. For example, processor 404 may include a processor (e.g., a central processing unit (CPU), a graphics processing unit (GPU), an accelerated processing unit (APU), and/or the like), a microprocessor, a digital signal processor (DSP), and/or any processing component (e.g., a field-programmable gate array (FPGA), an application-specific integrated circuit (ASIC), and/or the like) that can be programmed to perform a function. Memory 406 may include a random access memory (RAM), a read-only memory (ROM), and/or another type of dynamic or static storage device (e.g., a flash memory, a magnetic memory, an optical memory, and/or the like) that stores information and/or instructions for use by processor 404.

Storage component 408 may store information and/or software related to the operation and use of device 400. For example, storage component 408 may include a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, and/or another type of computer-readable medium, along with a corresponding drive.

Input component 410 may include a component that permits device 400 to receive information, such as via user input (e.g., a touch screen display, a keyboard, a keypad, a mouse, a button, a switch, a microphone, and/or the like). Additionally or alternatively, input component 410 may include a sensor for sensing information (e.g., a global positioning system (GPS) component, an accelerometer, a gyroscope, an actuator, and/or the like). Output component 412 may include a component that provides output information from device 400 (e.g., a display, a speaker, one or more light-emitting diodes (LEDs), and/or the like).

Communication interface 414 may include a transceiver-like component (e.g., a transceiver, a separate receiver and transmitter, and/or the like) that enables device 400 to communicate with other devices, such as via a wired connection, a wireless connection, or a combination of wired and wireless connections. Communication interface 414 may permit device 400 to receive information from another device and/or provide information to another device. For example, communication interface 414 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 400 may perform one or more processes described herein. Device 400 may perform these processes based on processor 404 executing software instructions stored by a computer-readable medium, such as memory 406 and/or storage component 408. A computer-readable medium (e.g., a non-transitory computer-readable medium) is defined herein as a non-transitory memory device. A non-transitory memory device includes memory space located inside of a single physical storage device or memory space spread across multiple physical storage devices.

Software instructions may be read into memory 406 and/or storage component 408 from another computer-readable medium or from another device via communication interface 414. When executed, software instructions stored in memory 406 and/or storage component 408 may cause processor 404 to perform one or more processes described herein. Additionally or alternatively, hardwired circuitry may be used in place of or in combination with software instructions to perform one or more processes described herein. Thus, embodiments described herein are not limited to any specific combination of hardware circuitry and software.

The number and arrangement of components shown in FIG. 4 are provided as an example. In some non-limiting embodiments, device 400 may include additional components, fewer components, different components, or differently arranged components than those shown in FIG. 4. Additionally or alternatively, a set of components (e.g., one or more components) of device 400 may perform one or more functions described as being performed by another set of components of device 400.

Although the present disclosure has been described in detail for the purpose of illustration based on what is currently considered to be the most practical and preferred embodiments, it is to be understood that such detail is solely for that purpose and that the present disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:

1. A computer-implemented method for remote authorization, comprising:
    receiving, with at least one processor, transaction data for a payment transaction from a merchant system comprising a point-of-sale (POS) device, the payment transaction initiated with a mobile device controlled by a requesting user at the POS device, the transaction data comprising a transaction value and a user identifier;
    generating, with at least one processor, a payment request message based on the transaction data;
    transmitting, with at least one processor, the payment request message to a first plurality of mobile devices;
    dynamically adjusting, with at least one processor, a first time period based on merchant data associated with a merchant involved in the payment transaction with the requesting user, the merchant data comprising traffic data for the POS device operated by the merchant;
    determining, with at least one processor, if at least one payment response message is received from at least one mobile device of the first plurality of mobile devices within the first time period;
    in response to determining that the at least one payment response message is not received within the first time period, transmitting, with at least one processor, the payment request message to a second plurality of mobile devices different from the first plurality of mobile devices;
    receiving, with at least one processor, a payment response message from a mobile device of the second plurality of mobile devices, the payment response message including an indication that the payment transaction is authorized; and
    in response to receiving the payment response message including the indication that the payment transaction is authorized, processing the payment transaction using a payment account associated with the mobile device that transmitted the payment response message.

2. The computer-implemented method of claim 1, wherein the transaction data further comprises an indication to process the payment transaction using the payment account, wherein the payment account is selected from a plurality of payment accounts, and wherein the payment request message is transmitted to the first plurality of mobile devices based on the payment account.

3. The computer-implemented method of claim 1, wherein each mobile device of the first plurality of mobile devices is associated with a first authorizing user or a secondary authorizing user, and wherein each mobile device of the second plurality of mobile devices is associated with a back-up authorizing user.

4. The computer-implemented method of claim 1, wherein transmitting the payment request message to the first plurality of mobile devices comprises:
    transmitting, with at least one processor, the payment request message to the mobile device associated with the requesting user via a short-range wireless communication connection,
    wherein the mobile device associated with the requesting user transmits the payment request message to the first plurality of mobile devices based on receiving the payment request message from a merchant system associated with a merchant involved in the payment transaction.

5. The computer-implemented method of claim 1, further comprising:
    registering, with at least one processor, each mobile device of the second plurality of mobile devices with at least one mobile device of the first plurality of mobile devices; and
    determining, with at least one processor, the payment account based on receiving the payment response message from the mobile device of the second plurality of mobile devices,
    wherein the payment account is controlled by a first authorizing user of a mobile device of the first plurality of mobile devices.

6. The computer-implemented method of claim 1, further comprising:
    determining, with at least one processor, the first time period based on the merchant data.

7. The computer-implemented method of claim 6, wherein the merchant data comprises an average amount of transactions initiated within a time period the POS device.

8. The computer-implemented method of claim 1, wherein generating the payment request message based on the transaction data comprises:
    determining, with at least one processor, that the payment transaction does not satisfy one or more rules,
    wherein the at least one processor transmits the payment request message to the first plurality of mobile devices based on determining that the payment transaction does not satisfy the one or more rules.

9. The computer-implemented method of claim 8, wherein determining that the payment transaction does not satisfy the one or more rules comprises determining, with at least one processor, at least one of the following:
    that an upper limit for transactions involving the requesting user will be exceeded if the payment transaction is authorized;
    that an upper limit of a plurality of transactions involving the requesting user will be exceeded if the payment transaction is authorized;
    that an amount of transactions authorized within a predetermined time period involving the requesting user will be exceeded if the payment transaction is authorized;
    that a location associated with the payment transaction is not associated with a defined area; or
    any combination thereof.

10. A computer-implemented method, comprising:
    generating, with at least one processor, a payment request message based on transaction data for a payment transaction involving a requesting user and a merchant system comprising a point-of-sale (POS) device, the payment transaction initiated with a mobile device controlled by the requesting user at the POS device;
    transmitting, with at least one processor, the payment request message to a mobile device associated with a first authorizing user, the first authorizing user associated with a first account identifier;
    dynamically adjusting, with at least one processor, a first time period based on merchant data associated with a merchant involved in the payment transaction with the requesting user, the merchant data comprising traffic data for the POS device operated by the merchant;
    determining, with at least one processor, that a payment response message is not received within the first time period after transmitting the payment request message to the mobile device associated with the first authorizing user;

in response to determining that the payment response message is not received within the first time period, transmitting, with at least one processor, the payment request message to at least one mobile device associated with at least one secondary authorizing user, the at least one secondary authorizing user associated with a second account identifier;

determining, with at least one processor, that the payment response message is not received within a second time period after transmitting the payment request message to the at least one mobile device associated with the at least one secondary authorizing user;

in response to determining that the payment response message is not received within the second time period, transmitting, with at least one processor, the payment request message to a mobile device associated with a back-up authorizing user;

receiving, with at least one processor, a payment response message including an indication that the payment transaction is authorized from the mobile device associated with the back-up authorizing user; and processing, with at least one processor, the payment transaction using a payment account associated with the first account identifier based on the payment response message.

11. The computer-implemented method of claim 10, further comprising:
determining, with at least one processor, at least one of the first time period and the second time period based on the merchant data.

12. The computer-implemented method of claim 10, further comprising:
determining, with at least one processor, the first time period based on the merchant data associated with the POS device of the merchant involved in the payment transaction.

13. The computer-implemented method of claim 10, wherein transmitting the payment request message to the mobile device associated with the first authorizing user is based on determining that the payment transaction does not satisfy one or more rules for transactions involving the requesting user.

14. The computer-implemented method of claim 10, further comprising:
receiving, with at least one processer, the transaction data for the payment transaction associated with the requesting user from a mobile device associated with the requesting user, the transaction data comprising a transaction value, a user identifier, and the first account identifier;
generating, with at least one processor, a payment request message based on the transaction data for the payment transaction; and
determining, with at least one processor, to transmit the payment request message to the mobile device associated with the first authorizing user based on the transaction data for the payment transaction.

15. The computer-implemented method of claim 10, further comprising:
registering, with at least one processor, the mobile device associated with the back-up authorizing user with the mobile device of the first authorizing user; and
determining, with at least one processor, a payment account based on receiving the payment response message from the mobile device associated with the back-up authorizing user,
wherein the payment account is controlled by the first authorizing user.

16. A system, comprising:
at least one processor programmed or configured to:
generate a payment request message based on receiving transaction data for a payment transaction from a mobile device controlled by a requesting user and a merchant system comprising a point-of-sale (POS) device, the payment transaction initiated with the mobile device controlled by the requesting user at the POS device;
transmit the payment request message to a first plurality of mobile devices;
dynamically adjust a first time period based on merchant data associated with a merchant involved in the payment transaction with the requesting user, the merchant data comprising traffic data for the POS device operated by the merchant;
determine if at least one payment response message is received from at least one mobile device of the first plurality of mobile devices within the first time period;
transmit the payment request message to a second plurality of mobile devices different from the first plurality of mobile devices based on determining that the at least one payment response message was not received within the first time period;
receive a payment response message from a mobile device of the second plurality of mobile devices, the payment response message comprising an indication that the payment transaction is authorized and an account identifier; and
process the payment transaction based on the payment response message.

17. The system of claim 16, wherein the at least one processor is further programmed or configured to:
register each mobile device of the second plurality of mobile devices with at least one mobile device of the first plurality of mobile devices,
wherein each mobile device of the first plurality of mobile devices is associated with an account identifier for a payment account controlled by a first authorizing user or a secondary authorizing user; and
wherein each mobile device of the second plurality of mobile devices is configured to transmit the payment response message to cause the at least one processor to process the payment transaction based on the account identifier associated with the at least one mobile device of the first plurality of mobile devices that is registered with the mobile device that transmitted the payment response message.

18. The system of claim 17, wherein, when processing the payment transaction based on the payment response message, the at least one processor is programmed or configured to:
determine the payment account based on the account identifier;
generate an authorization request message based on the transaction data for the payment transaction and the payment account; and
transmit the authorization request message to at least one issuer system.

19. The system of claim 16, wherein the at least one processor is further programmed or configured to:
  determine the first time period based on the merchant data.

20. The system of claim 16, wherein, when transmitting the payment request message to the first plurality of mobile devices is based on determining that the payment transaction does not satisfy one or more rules.

* * * * *